United States Patent Office 2,729,610
Patented Jan. 3, 1956

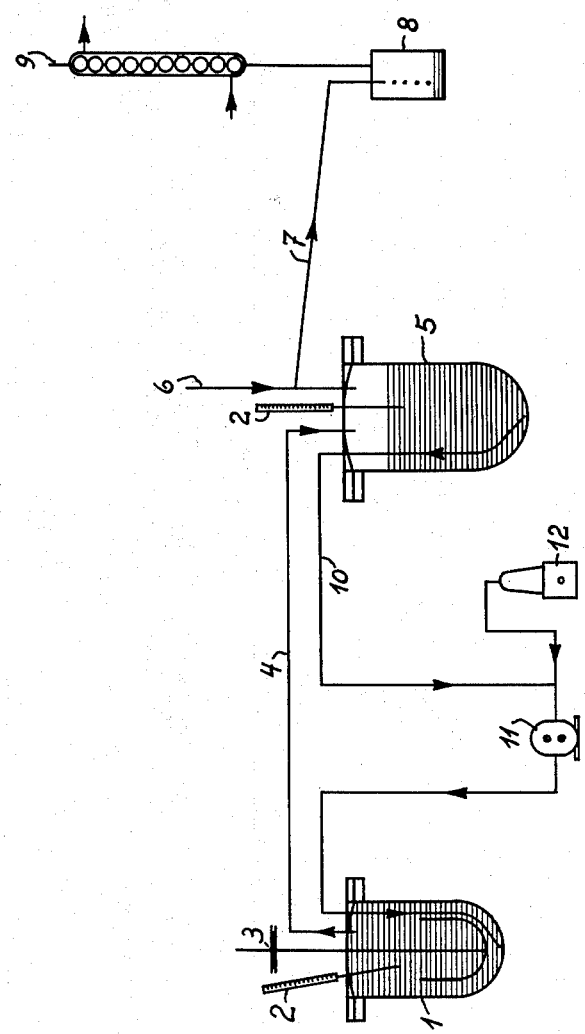

2,729,610

PROCESS FOR POLYMERISING MONOMERIC AROMATIC VINYL COMPOUNDS

Heinz Ehring, Krefeld, and Karl Raichle, Krefeld-Uerdingen, Germany, assignors to Farbenfabriken Bayer Aktiengesellschaft, Leverkusen, Germany, a corporation of Germany Application August 1, 1951, Serial No. 239,716

Claims priority, application Germany August 4, 1950

15 Claims. (Cl. 260—22)

It is known to polymerise styrene by heating it in the presence of an ester of a polyvalent alcohol containing unsaturated fatty acid radicals, with or without the addition of a solvent. For this purpose either a mixture of the ester and styrene is heated, or the monomeric styrene is added with stirring to the heated ester. This method has the disadvantage that polymerisation of the styrene frequently occurs in the gas phase and thus non-homogeneous products are obtained.

According to the present invention monomeric aromatic vinyl compounds are smoothly combined into homogeneous products by polymerisation in an ester of a polyvalent alcohol containing a radical of a higher unsaturated fatty acid. This is achieved by gradually introducing the monomeric aromatic vinyl compound into the liquid phase of the ester which is heated at a temperature between the boiling point of the monomeric aromatic vinyl compound and the decomposition point of the reaction mixture. The latter is circulated with recycling, at one or more points, in such a manner that the reaction is completed before the aromatic vinyl compound can evaporate. The recycling of the reaction mixture can be effected for example in a closed system of pipes and/or containers with the aid of a pump. The introduction of the monomeric aromatic vinyl compound into the liquid phase of the ester may be effected by means known per se, for example, an injection pump. The points of introduction are so selected that the monomeric aromatic vinyl compound is polymerised within the liquid phase before the gas phase is reached.

Amongst the esters of polyvalent alcohols containing a radical of a higher unsaturated fatty acid which are suitable as starting substances for the present process, are, e. g. vegetable or animal oils comprising a radical of an unsaturated higher fatty acid, such as olive oil, groundnut oil, palm oil, and rape oil; semi-drying oils, such as cottonseed oil, poppyseed oil, soya oil, sardine oil, fishliver oil, menhaden oil, and pilchard oil; and also natural drying oils, such as linseed oil, perilla oil, wood oil, and oiticica oil. Furthermore synthetic drying oils, such as dehydrated castor oil, isomerised linseed oil and soya oil may be mentioned. In addition, esters of the specified nature of the alkyd resin type may be used, i. e. alkyd resins which contain besides a radical of a higher unsaturated fatty acid a radical of a polybasic carboxylic acid, such as the radical of malonic, succinic, glutaric, adipic, sebacic, methylmalonic, maleic, itaconic, perfluoroadipic, phthalic and 1,2,4-butane tricarboxylic acid. Instead of the above mentioned natural glycerine esters use may be made of the synthetic esters of the unsaturated higher fatty acids of the natural esters mentioned above with other polyvalent alcohols than glycerine, e. g. glycol, pentaerythrite, mannitol, sorbitol, erythrol, trimethylol propane, trimethylol ethane and hexane triol.

In addition to styrene the following aromatic vinyl compounds may be used: para-methylstyrene, para-chlorostyrene, para-fluorostyrene, meta-chlorostyrene, meta-fluorostyrene, meta- and para-trifluoromethylstyrene, ortho- and meta-hydroxystyrene, methoxystyrenes, vinyl-naphthaline, and the like. Substituents may also be present on the vinyl group, as in alpha-methylstyrene, but of course not in a manner such as to retard polymerisation. Especially preferred monovinylaromatic compounds are the styrene derivatives, and particularly styrene itself, alpha-methylstyrene, and fluorostyrene.

If desired, the reaction may be carried out in the presence of a solvent. Suitable solvents are, for example, carbon tetrachloride, benzine, turpentine oil, benzene, chlorobenzene, toluene, xylene, ethyl benzene, and mixtures of the above mentioned aromatic hydrocarbons with benzine.

By the addition of catalysts, such as peroxide compounds for example benzoyl peroxide, the polymerisation can be promoted.

The following examples illustrate the invention:

*Example 1*

The polymerisation of styrene in the presence of linseed oil is carried out as follows in the apparatus illustrated diagrammatically in the accompanying drawing:

A stirring vessel 1, provided with a thermometer 2 and a stirrer 3 and having a capacity of about 5.5 litres is completely filled with 6.09 kg. of linseed oil and heated to 200 C. The vessel 1 is connected by a tube 4 to a vessel 5 of the same capacity and equipped with a further thermometer 2 and a tube 6 for the admission of nitrogen as inert gas. From this tube 6 a tube 7 branches off to the overflow vessel 8, which is provided with a reflux cooler 9 and which serves to receive any water split off. From the base of the vessel 5 a pipe 10 leads through a circulating pump 11 back to the base of the stirring vessel 1. At a point, situated between the vessel 5 and the circulating pump 11, in the pipe 10 4.8 kg. of styrene are uniformly introduced over 24 hours with the aid of an injection pump 12. The linseed oil is at the same time circulated at a speed of 5 litres per minute. After the whole of the styrene has been added, heating is continued for a further 6 hours, to a temperature of 200° C., with further circulation by pumping.

In this way there is obtained a homogeneous reaction product with a content of solid substance of about 98%. The product is completely soluble in benzine, very compatible with basic pigments, and supplies lacquers which, after the addition of drying agents, dry in the air without tackiness within 3 to 4 hours.

*Example 2*

If, instead of the linseed oil used in Example 1, use is made of a mixture of 1.03 kg. of wood oil and 5.06 kg. of linseed oil, at a reaction temperature of 175° C., there is obtained a homogeneous resin which is largely soluble in white spirit and which yields quick drying and hard films.

*Example 3*

If, instead of the linseed oil used in Example 1, use is made of 6.24 kg. of a phthalic acid-linseed-oil-modified alkyd resin, produced in known manner and having an oil content of 77.5%, and if 5 kg. of styrene are added uniformly within 40 hours at 200° C. a homogeneous resin is obtained having a content of solid substance of 96% and which yields quick drying, hard, and weather-resistant gloss lacquers.

We claim:

1. Process for polymerizing a monomeric aromatic vinyl compound selected from the group consisting of vinyl naphthalene, styrene, alpha alkyl styrenes, and styrenes substituted in the nucleus by a group of the class consisting of an alkyl group, a hydroxy group, an alkoxy group and a halogen group, in the presence of an ester of a polyvalent alcohol containing a radical of a higher unsaturated fatty acid, which comprises rapidly circulating and recirculating the liquid reaction mixture through a predetermined path in a closed system comprising an elongated narrow zone, said reaction mixture passing through a narrow zone at a rate of many times per hour, gradually introducing the monomeric aromatic vinyl compound into the liquid phase of the ester substantially before the end of said narrow zone, heating the reaction mixture to a temperature between the boiling point of the aromatic vinyl compound and the decomposition temperature of the reaction mixture, and controlling the rate of introduction of the monomeric aromatic vinyl compound to permit some polymerization of the aromatic vinyl compound prior to the recirculation thereof through the narrow zone, whereby the reaction mixture in the recirculation path just prior to the narrow zone has only a very slight vapor pressure of the monomeric aromatic vinyl compound.

2. The method of claim 1 in which the ester is an alkyd resin.

3. The method of claim 1 in which the monomeric aromatic vinyl compound is styrene.

4. The method of claim 1 in which the ester is an alkyd resin and in which the monomeric aromatic vinyl compound is styrene.

5. The process of polymerizing styrene in the presence of a phthalic acid linseed oil modified alkyd resin which comprises heating a mixture thereof to a temperature of about 200° C., rapidly circulating and recirculating the liquid reaction mixture in a closed system comprising an elongated narrow zone, and gradually introducing the styrene into the liquid reaction mixture substantially before the end of said narrow zone at a rate sufficient that substantially all of the styrene reacts during one cycle of the circulation of the reaction mixture and before reentry into the narrow zone, whereby the reaction mixture at a point in the recirculation path just prior to the point of introduction of the styrene has a negligible styrene vapor pressure and is exposed to a vapor zone without evaporation loss of styrene.

6. The method of claim 1 in which the ester is a material selected from the group consisting of a vegetable and an animal oil.

7. The method of claim 1 in which the ester is a drying oil.

8. The method of claim 1 in which the ester is a natural drying oil.

9. The method of claim 1 in which the ester is a synthetic drying oil.

10. The method of claim 1 in which the monomeric aromatic vinyl compound is styrene and the ester is a material selected from the group consisting of a vegetable and an animal oil.

11. The method of claim 1 in which the monomeric aromatic vinyl compound is styrene and the ester is a drying oil.

12. The method of claim 1 in which the monomeric aromatic vinyl compound is styrene and the ester is a natural drying oil.

13. The method of claim 1 in which the monomeric aromatic vinyl compound is styrene and the ester is a synthetic drying oil.

14. The method of claim 1 in which the monomeric aromatic vinyl compound is styrene and the ester is linseed oil.

15. The method of claim 1 in which the monomeric aromatic vinyl compound is styrene and the ester is a mixture of wood oil and linseed oil.

References Cited in the file of this patent

UNITED STATES PATENTS

| | | |
|---|---|---|
| 2,574,753 | Opp et al. | Nov. 13, 1951 |
| 2,600,623 | Daniel et al. | June 17, 1952 |
| 2,602,071 | Haines | July 1, 1952 |
| 2,606,161 | Marling | Aug. 5, 1952 |

FOREIGN PATENTS

| | | |
|---|---|---|
| 622,948 | Great Britain | May 10, 1949 |